United States Patent [19]

Shepherd et al.

[11] Patent Number: 4,730,771

[45] Date of Patent: Mar. 15, 1988

[54] AIR DUCT

[75] Inventors: Charles G. Shepherd; Thomas E. Squires, both of Oakville, Canada

[73] Assignee: B. D. Wait Co. Limited, Oakville, Canada

[21] Appl. No.: 866,856

[22] Filed: May 27, 1986

[30] Foreign Application Priority Data

May 30, 1985 [CA] Canada .................................. 482850

[51] Int. Cl.$^4$ ........................................... G05D 23/00
[52] U.S. Cl. ..................................... 236/13; 236/49; 237/55
[58] Field of Search ...................... 237/55, 54; 236/10, 236/49, 13, 12.14, 12.1, 12.11; 126/117

[56] References Cited

U.S. PATENT DOCUMENTS 3,009,643  11/1961  Dibert .................................. 237/55

Primary Examiner—Henry A. Bennett
Attorney, Agent, or Firm—Rogers & Scott

[57] ABSTRACT

This invention provides a device for meeting the demand of a forced-air furnace for make-up air in a building, the make-up air being available from a duct leading from outside the building. The device takes warm air from the hot air plenum of the furnace and returns the air to the return air plenum. This flow of air is caused by a differential pressure between the two ducts when the furnace is operational and operates a valve element which normally closes the duct carrying outside air and opens to permit flow of this air in response to the passage of warm air between the hot air and return plenums.

3 Claims, 6 Drawing Figures

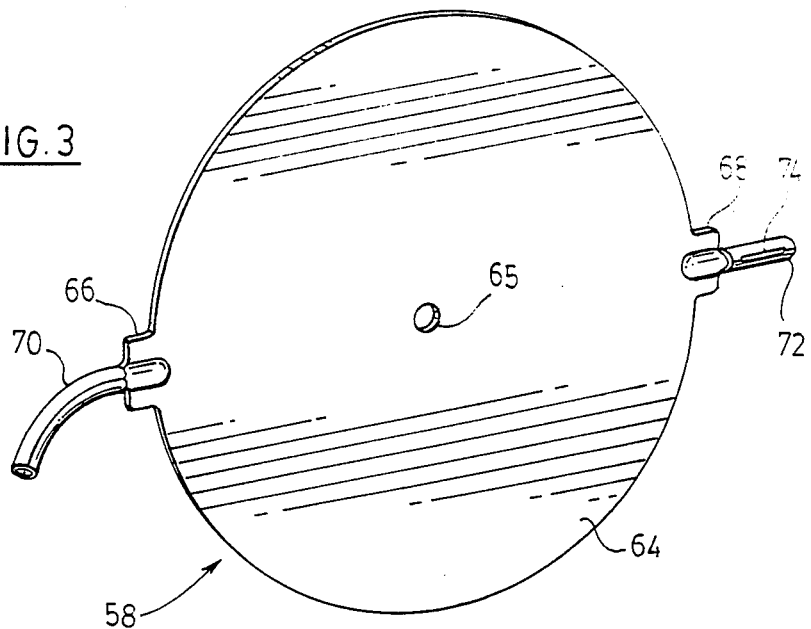
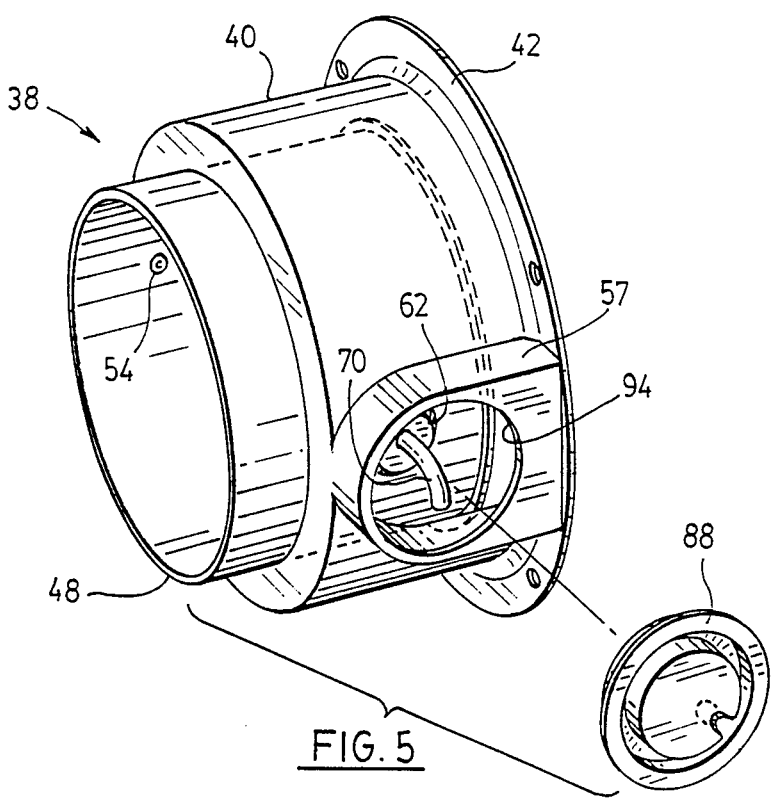

AIR DUCT

This invention relates to forced air heating systems and in particular a device for mixing a proportion of internal heated air with some air inspired from outside a building.

Forced air furnaces are used in domestic heating systems to maintain acceptable temperature levels in houses during cold weather conditions. Commonly the systems use oil or gas as the fuel and a burner and heat exchanger are used to heat air which is circulated through a duct system in the house by a fan in the furnace. The operation is controlled by a thermostat which senses when the temperature in the house at the location of the thermostat drops to a preselected level, and this activates the furnace.

Air is heated and circulated until the thermostat reaches an upper predetermined setting at which point the burner switches off and the fan continues to circulate the warmed air either continuously at a lower speed in a two-speed system, or for a predetermined time interval in a single speed system. The furnace will remain off until the air at the thermostat again drops to the lower preselected temperature.

Home owners commonly seal the cracks around windows and doors to reduce heat loss and thereby save on heating costs. Many house owners have gone to great lengths to fit better windows and doors and to generally seal the living area of the house against draughts. Taken to the extreme, this will affect the efficiency of the furnace and its ability to inspire air required for combustion. Such starvation can be aggravated by the simultaneous use of kitchen and bathroom extractor fans and clothes driers which exhaust outside the house. As a result, structures have been developed to connect the return air plenum on the furnace to outside air. This acts as a pressure equalizer between the inside of the house and the outside and allows cold air from outside the house to move into this plenum.

Such systems have major drawbacks. Firstly, a duct connecting the furnace to the outside of the house is sensitive to wind conditions on the outside of the house and can also result in cold air shock. This phenomenon is caused by the cold air entering the system under wind pressure and causing a sudden drop in temperature in areas adjacent to duct outlets in the house. Because these outlets are remote from the thermostat, there can consequently be a noticeable cold draught before the furnace switches on resulting in unacceptable extremes in temperature in parts of living areas.

It is an object of the present invention to provide an air mixer for attachment to a forced air furnace to provide for adequate make up air from outside the house on demand and without causing thermal shocks and with minimum sensitivity to external wind conditions.

Accordingly, in one of its aspects, the invention provides a device for meeting the demand of a forced-air furnace for make-up air in a building, the make-up air being available from a duct leading from outside the building. The device takes warm air from the hot air plenum of the furnace and returns the air to the return air plenum. This flow of air is caused by a differential pressure between the two ducts when the furnace is operational and operates a valve element which normally closes the duct carrying outside air and opens to permit flow of this air in response to the passage of warm air between the hot air and return plenums.

The invention will be better understood with reference to the drawings, in which:

FIG. 3 is a perspective view of a butterfly valve element used in the air mixer;

FIG. 5 is a perspective view of the assembled device showing a valve limiter forming part of the device.

Figure 1:
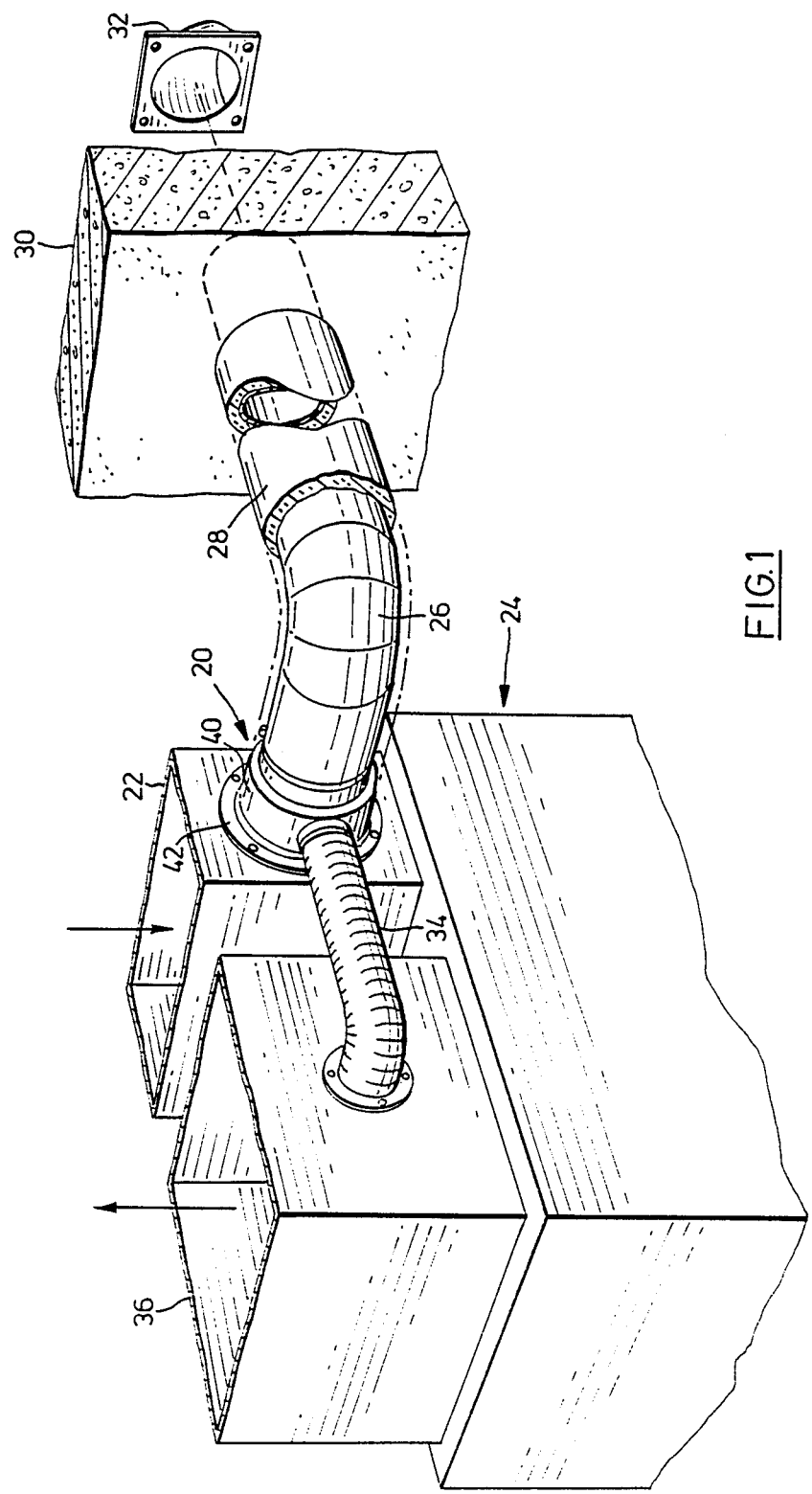
FIG. 1 is a perspective view of a device for mixing air according to a preferred embodiment of the invention, and mounted on the return air plenum of a forced air furnace to mix air from the plenum with fresh make-up air from outside the building.

Reference is made first to FIG. 1 which shows a device or air mixer 20 attached to the wall of an inlet plenum 22 of a forced air furnace 24. The air mixer 20 receives air via a duct 26 having thermal insulation 28, the duct extending through the wall of a containing house or building 30 and having an outer end protected by a downwardly opening cover 32. Air received from the duct is mixed with air received from a smaller duct or bleed pipe 34 connected both to the air mixer 20 and to a hot air plenum 36 of the furnace 24. As will be described, the arrangement is such that the differential pressure between the plenums 36 and 22 causes some of the hot air from plenum 36 to bleed through pipe 34 into the mixer 20 and this results in opening a valve in the mixer to permit external air to be drawn through the duct 26 into the mixer 20, and after some mixing with warm air from pipe 34, into the inlet plenum 22.

It will be appreciated that the arrangement is such that air will be drawn through the outside air duct 26 only if there exists a differential pressure between the plenum 22 on the inside of the building and the air outside the building. This differential can be created by the furnace in buildings which are well sealed and is becoming more common because buildings are being insulated and sealed to improve their capability to retain heat and thereby reduce fuel costs for heating the building.

Figure 2:
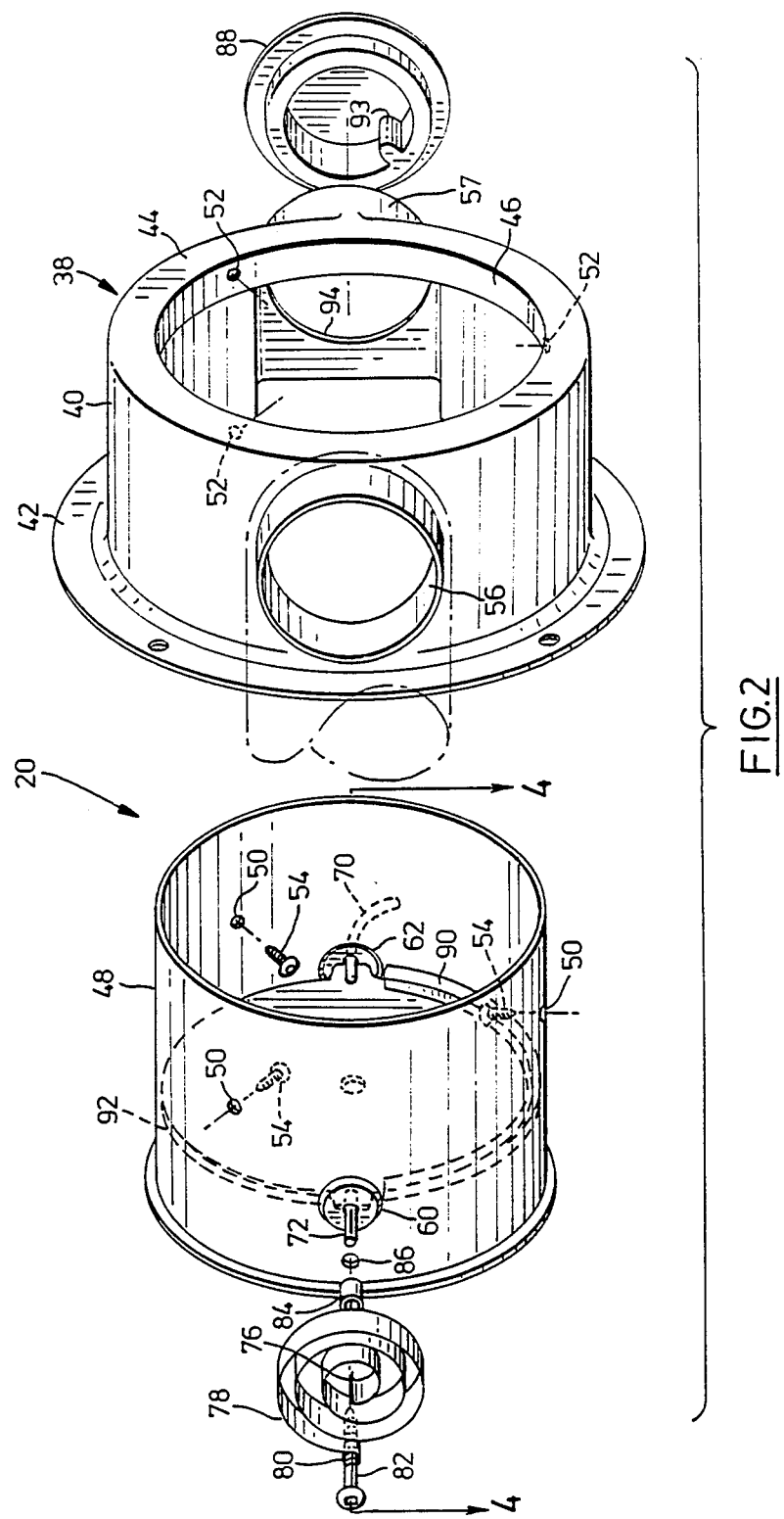
FIG. 2 is an exploded perspective view of the device.

Reference is next made to FIG. 2 which shows the air mixer 20 in greater detail. It will be seen that a housing 38 has a cylindrical main portion 40 terminating at one end in an attachment flange 42 by which the housing is attached to the plenum 22 (FIG. 1), and at its other end at an inturned flange 44 which terminates in a re-entrant cylindrical portion 46. This portion is proportioned to slidably receive an inner tube 48 of galvanised sheet steel and having three openings 50 for alignment with smaller openings 52 in the re-entrant cylindrical portion 46 to receive self-tapping screws 54 which hold the inner tube 48 in the housing 38 with the axes of these parts coincident.

The main portion 40 of the housing 38 blends at one side of the housing into a tubular boss 56 and, at the opposite side into a projection 57 which, as will be described, is shaped to provide clearance for a valve limiter. This limiter is associated with a butterfly element 58 mounted between outwardly projecting deformations, 60, 62 at diametrically opposed positions in the inner tube 48.

The butterfly valve element 58 is best seen in FIG. 3. This element is essentially a circular disc 64 having pairs of locating shoulders 66, 68 for engagement on the inner surfaces of the deformations 60, 62 (FIG. 2) and a pair of extensions 70, 72 which are formed from the sheet metal of the disc and consequently show seams along their lengths. The extension 70 is curved in the plane of the disc and forms part of the valve limiter as will be described. At the other side of the disc, extension 72 is straight and is penetrated by an axial slot 74 which extends right through the extension.

Returning to FIG. 2, the projection 72 extends through the wall of the inner tube 48 to receive a tongue 76 at the inner end of a spiral and thermally sensitive spring 78. The other end of the spring includes a curl 80 to receive an anchor screw 82 which also passes through a spacer sleeve 84 before being fixed to the inner tube 48 by engagement in an opening 86. The arrangement after assembly is seen in FIG. 4.

The curved extension 70 passes through the deformation 62 and is contained in the projection 57 of the main portion 40 of the housing 38. As will be explained, this projection combines with a cap 88 to limit rotational movement of the butterfly element between the position shown in FIG. 2 where the element is engaged against a pair of semi-circular seals 90, 92 and a position where the extension 70 meets an internal projection 93 on the cap 88. This will be more fully explained with reference to FIG. 6.

Figure 4:
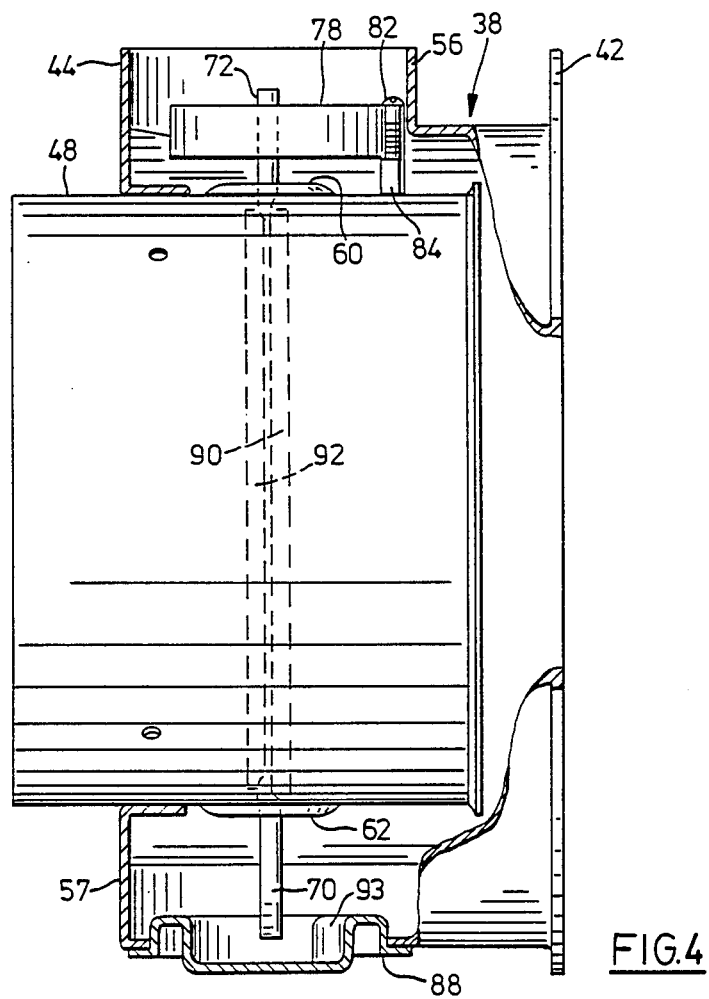
FIG. 4 is sectional side view of the device drawn generally on line 4—4 of FIG. 2 and showing the device in an assembled condition.

Reference is next made to FIG. 4 to better describe the relationship of the parts shown in FIG. 2 after assembly. The housing 38 now contains the inner tube 48 which extends outwardly of the housing past the flange 44 to provide for attachment of the duct 26 shown in FIG. 1. The thermally sensitive spring 78 is contained within the projection 56 which is cylindrical to receive the smaller duct 34 (FIG. 1) so that warm air from the plenum 36 will enter the projection 56 and pass over the spring 78. The air will then tend to distribute around the inner tube 48 before finding its way into the return plenum 22 (FIG. 1) as it passes out of the housing 38 in an axial direction. This distribution of warm air both enhances mixing with air from outside the building as it passes axially from the inner tube 48 to the plenum 22, and also ensures that the housing is not subjected directly to cold air which could cause local condensation problems.

Figure 6:
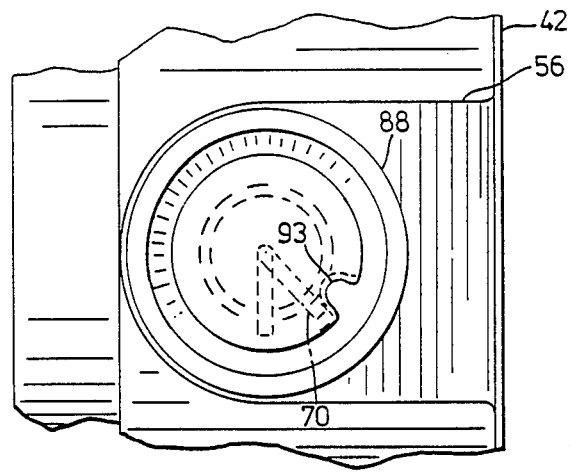
FIG. 6 is a side view of a portion of the device and showing the valve limiter.

Initially, the butterfly valve element 58 is biased by the spring 78 into engagement with seals 90, 92 and, apart from the bleed hole 65 provided at the center of the disc 64 (FIG. 3) there will be no flow from outside the building. However, when the furnace circulating fan is activated to heat air, there will be a pressure difference between the hot and cold plenums of the furnace resulting in a flow of warm air over the spring 78. This will cause the thermally sensitive spring to drive the valve element 58 away from the seals 90, 92 thereby providing access for outside air into the air mixer 20. The valve element will continue to move until the curved extension 70 meets the stop 93 on the inside of the cap 88 as shown in FIG. 6. The position of this stop can be varied because the cap is a friction fit in an opening 94 (FIG. 2) of the projection 57 so that the user can rotate the cap to bring the stop into the best position for a particular installation.

Once the valve is open, air from outside the building is available on demand to make-up for air used in combustion or lost from the building by other means such as exhaust fans. Consequently the furnace will not be starved of combustion air thereby ensuring proper furnace operation.

While the furnace is producing hot air, the butterfly valve element will remain in an open position and as soon as the furnace discontinues heating air, the disc will gradually move into the original position to seal the valve and prevent the ingress of air from outside the building.

It will be evident that the structure is self controlling in the sense that it will be closed until such time as the furnace begins to heat air and it will then close shortly after the furnace stops heating the air. As a result of this, cold air enters the building only when it is required and then it is mixed with warm air to prevent thermal shock. Also, the structure permits some flexibility because the user can predetermine the rate of flow of cold air using the valve limiter arrangement. This will be to some extent a matter of experience, but installers will soon recognize the range that is reasonable for a given size of house and type of furnace.

A further feature is that when the furnace is switched off, the positive closure of the valve element and the fact that it is mounted on an axis passing through the center of the disc, means that any wind pressure entering the duct 26 (FIG. 1) from outside the house will not be a problem because the valve will not respond to wind pressure.

It will be evident that the invention can take numerous forms other than the preferred embodiment described above, and such forms are within the scope of the claimed invention.

We claim:

1. An air mixer for use with a forced air heating system, including a forced air furnace having an inlet plenum and an outlet plenum, the inlet plenum feeding the furnace with return air and the outlet plenum conveying warm air from the furnace for distribution to premises being heated by the furnace, the air mixer comprising:

a housing having means for attachment to the inlet plenum of the furnace at one end of the housing, and connection means on the side of the housing to receive warm air from a warm air duct connected to the outlet plenum;

an inner tube attached to the other end of the housing and defining an annular space between this tube and the housing for distribution of warm air from the warm air duct as this air passes through the housing and into the inlet plenum, the inner tube projecting outside the housing at said other end for attachment to an outside air duct for receiving outside make-up air;

a butterfly valve element comprising a plate having a pair of integrally formed oppositely directed extensions which transverse the inner tube walls for pivotally supporting the valve element in the inner tube, the butterfly valve element being movable between a closed position to stop possible flow of outside make-up air and at least one open position allowing flow of outside make-up air into the air mixer for mixing with the warm air in the housing before flowing into the inlet plenum;

heat sensitive biasing mean coupled to one of said extensions of the element and located in the flow of said warm air for responding to the warm air to move the butterfly valve element from the closed to the open position whereby when the furnace is activated warm air will flow through the warm air duct, and upon heating the biasing means, the valve element will move away from the closed position to allow any required make-up air to flow through the outside air duct; and a valve limiter coupled to the housing and located in the path of movement of the valve element to stop movement of the butterfly valve element away from the closed position at a preselected angle and so limit the flow of outside make-up air.

2. An air mixer as claimed in claim 1 in which the valve limiter comprises a projection provided on a rotatable cap which is friction fit into an opening of the housing so that the position of the projection relative to the housing is infinitely adjustable and the degree to which the flow of outside make-up air is limited may be controlled.

3. An air mixer as claimed in claim 1 in which the heat sensitive biasing means and the valve limiter are located on opposite sides of the butterfly valve element with the heat sensitive biasing means situated in the connection means for receiving warm air.

* * * * *